United States Patent
Maurer et al.

(10) Patent No.: US 10,139,230 B2
(45) Date of Patent: Nov. 27, 2018

(54) METHOD AND CIRCUIT FOR THE TIME-CONTINUOUS DETECTION OF THE POSITION OF THE SENSOR MASS WITH SIMULTANEOUS FEEDBACK FOR CAPACITIVE SENSORS

(71) Applicant: Albert-Ludwigs-Universitat Freiburg, Freiburg (DE)

(72) Inventors: Michael Maurer, Rheinhausen (DE); Sebastian Nessler, Gundelfingen (DE); Yiannos Manoli, Freiburg (DE)

(73) Assignee: Albert-Ludwigs-Universitat Freiburg, Freiburg (DE)

( * ) Notice: Subject to any disclaimer, the term of this patent is extended or adjusted under 35 U.S.C. 154(b) by 162 days.

(21) Appl. No.: 15/076,062

(22) Filed: Mar. 21, 2016

(65) Prior Publication Data

US 2016/0202061 A1    Jul. 14, 2016

Related U.S. Application Data

(63) Continuation of application No. PCT/EP2014/069886, filed on Sep. 18, 2014.

(30) Foreign Application Priority Data

Sep. 20, 2013   (DE) .................. 10 2013 218 973

(51) Int. Cl.
*G01C 19/5726* (2012.01)
*G01C 19/5755* (2012.01)
(Continued)

(52) U.S. Cl.
CPC ..... *G01C 19/5726* (2013.01); *G01C 19/5755* (2013.01); *G01C 19/5762* (2013.01); *G01C 19/5776* (2013.01); *G01P 15/125* (2013.01)

(58) Field of Classification Search
CPC ............ G01C 19/5726; G01C 19/5755; G01C 19/5762; G01C 19/5776; G01P 15/125
See application file for complete search history.

(56) References Cited

U.S. PATENT DOCUMENTS 5,519,323 A * 5/1996 Kordas ................. G01N 27/06
                                                    257/532
6,450,031 B1 * 9/2002 Sakai .................... B81B 3/0086
                                                    73/514.16
(Continued)

FOREIGN PATENT DOCUMENTS

DE    102005046699 A1    4/2007
DE    102008036191 A1    10/2010
(Continued)

OTHER PUBLICATIONS

T. Northermann, et al., Compensation Technique for Capacitive Crosstalk in Continuous-Time Electro-Mechanical Sigma-Delta Modulators, Procedia Engineering, 2011, vol. 25, pp. 1281-1284.
(Continued)

*Primary Examiner* — Helen Kwok
(74) *Attorney, Agent, or Firm* — Barley Snyder

(57) ABSTRACT

The invention relates to a detection circuit for reading out at least one position signal of a micromechanical capacitive sensor having at least one oscillating element that can be excited so as to move in an oscillating manner. In particular, the invention relates to a sensor that is operated in a closed control loop by using the detection circuit according to the invention. The invention further relates to a method for operating such a sensor. During operation, a first input connection of the detection circuit (100) is connected to an output connection of the capacitive sensor (106) and an output connection of the detection circuit (100) is connected to a loop filter of a control loop (102), wherein the control loop feeds back a feedback voltage for providing a restoring
(Continued)

force in dependence on an output voltage of the control loop (102) to a second input connection of the detection circuit (100). The detection circuit (100) comprises at least one further feedback branch ($R_{fb}$, $C_{fb}$), and the output voltage of the control loop (102) is modulated onto an in-phase input voltage of the detection circuit.

18 Claims, 12 Drawing Sheets

(51) Int. Cl.
    *G01C 19/5762*      (2012.01)
    *G01C 19/5776*      (2012.01)
    *G01P 15/125*      (2006.01)

(56) References Cited

U.S. PATENT DOCUMENTS

| | | | |
|---|---|---|---|
| 6,578,420 B1 | 6/2003 | Hsu | |
| 6,970,126 B1* | 11/2005 | O'Dowd | H03M 3/34 |
| | | | 341/143 |
| 7,188,523 B2 | 3/2007 | Wyse et al. | |
| 8,127,603 B2* | 3/2012 | Nagata | G01D 3/024 |
| | | | 73/1.01 |
| 8,861,765 B2 | 10/2014 | Buck et al. | |
| 8,885,849 B2 | 11/2014 | Arias-Drake et al. | |
| 2002/0071578 A1* | 6/2002 | Van Der Zwan | H04R 3/00 |
| | | | 381/111 |
| 2003/0052699 A1* | 3/2003 | Lasalandra | G01D 3/066 |
| | | | 324/662 |
| 2006/0008097 A1* | 1/2006 | Stenberg | H04R 3/007 |
| | | | 381/113 |
| 2007/0163815 A1* | 7/2007 | Ungaretti | G01P 15/125 |
| | | | 178/18.06 |
| 2009/0316935 A1* | 12/2009 | Furst | H03F 1/3211 |
| | | | 381/111 |
| 2012/0013351 A1* | 1/2012 | Daniel | G01D 5/24 |
| | | | 324/602 |
| 2012/0076339 A1* | 3/2012 | Buck | H04R 3/007 |
| | | | 381/369 |
| 2012/0242389 A1 | 9/2012 | Sato et al. | |

FOREIGN PATENT DOCUMENTS

| | | |
|---|---|---|
| DE | 102010053022 B4 | 1/2014 |
| EP | 2259019 A1 | 12/2010 |
| JP | 11337342 A | 12/1999 |
| JP | 2005300231 A | 10/2005 |
| JP | 2006126095 A | 5/2006 |

OTHER PUBLICATIONS

Abstract of JPH11337342, dated Dec. 10, 1999, 2 pages.
Abstract of JP2006126095, dated May 18, 2006, 2 pages.
Abstract of JP2005300231, dated Oct. 27, 2005, 2 pages.
Japanese Office Action and English translation, dated May 18, 2017, 14 pages.
German Office Action, dated Jul. 2, 2014, 5 pages.

* cited by examiner

METHOD AND CIRCUIT FOR THE TIME-CONTINUOUS DETECTION OF THE POSITION OF THE SENSOR MASS WITH SIMULTANEOUS FEEDBACK FOR CAPACITIVE SENSORS

CROSS-REFERENCE TO RELATED APPLICATIONS

This application is a continuation of PCT International Application No. PCT/EP2014/069886, filed on Sep. 18, 2014 which claims priority under 35 U.S.C. § 119 to German Patent Application No. 102013218973.7, filed on Sep. 20, 2013.

FIELD OF THE INVENTION

The present invention relates to detection circuits for reading out at least one position signal of a micromechanical capacitive sensor with at least one oscillating element that can be excited so as to move in an oscillating manner, for example acceleration sensors or turn ratio sensors. In particular, the invention relates to a rotation rate sensor that is operated in a closed control loop, for example a sigma-delta control loop, by using the detection circuit according to the invention. The invention further relates to a method for operating such a sensor.

BACKGROUND

Rotation rate sensors e.g. are used in driver assistance systems, in the vehicle dynamics control (electronic stability program. ESP) and in navigation systems. Thereby, these sensors detect rotation rates around a defined axis based on the Coriolis effect. The rotation rate sensor comprises two masses, i.e. the primary and the secondary mass. In order to be able to detect a rotation rate by means of the Coriolis effect, the entire mass must be brought into motion. The primary mass, in which the secondary mass is fixed, is brought into a constant oscillation. By a rotation of the sensor around a sensitive axis, the secondary mass is deflected orthogonally to the primary axis with the Coriolis force $\vec{F}_c$:

$$\vec{F}_c = -2 \cdot m \cdot \vec{\Omega} \times \vec{v}_p, \quad \text{Equation 1}$$

Thereby, mass is m, $\Omega$ is the rotation rate, and $v_p$ is the speed of the primary mass. The secondary mass, thereby, ideally is mechanically fixed in a way that can only be deflected orthogonally to the primary oscillation.

By using the rotation rate sensor in an electromechanical sigma-delta, the control loop serves as the feedback signal for feeding back the deflection of the secondary mass and, thus, as direct measure for the forces acting on the secondary mass. An example for such a sigma delta control loop is suggested in DE 10 2012 222 225 and is known from U.S. Pat. No. 6,253,612 B1.

The advantages of using a sigma delta control loop hereby are the digitally present output signal as well as improved properties of the entire system in comparison to systems, which are not fed back.

Depending on the structure of the rotation rate sensor, either the detection electrodes as well as separate feedback electrodes are available, or the detection and feedback has to be achieved by the same electrodes. In the first case, the feedback electrodes are typically used additionally when adjusting the resonance frequency of the detection oscillator as well as for compensation of so-called quadrature errors.

In the second case usually additional electrodes for adjusting the resonance frequency and for the quadrature compensation are available, which, however, cannot be used for feeding back the Coriolis signal due to the sensor structure. This method using the same electrodes for detection and feedback offers the possibility to reduce the sensor size.

If separate electrodes for the feedback are available, the compensation of the Coriolis force can be compensated by applying voltage to these electrodes. This kind of feedback is also known as "non-collocated feedback" and is described in the article Northemann, T.; Maurer, M.; Buhmann, A.; He, L. & Manoli, Y. "Excess Loop Delay compensated Electro-Mechanical Bandpass Sigma-Delta Modulator for Gyroscopes", Eurosensors XXIII, Lausanne, Switzerland, 2009, 1183-1186.

As far as only one set of electrodes for detection and feedback is available, usually a part of the provided time for the detection and a part for feeding back the sensor mass is used ("time multiplexing"). For this, the used detection circuit (usually a so-called "charge integrator") is separated from the sensor during the time required for the feedback by means of switches and the signals required for the feedback are applied to the sensor. Detection and feedback, thus, are performed alternately. This kind of feedback is preferably used in connection with the switched-capacitor technique.

FIG. 1 shows a schematic sketch of an acceleration sensor 106 with a movable center plate (at the so-called seismic mass, which also can be designated as oscillating element) and with fixed outer electrodes.

The manufacturer Analog Devices e.g. offers with the component ADLX50 [Analog Devices, ADXL50, Datasheet (http://www.analog.com/en/obsolete/adx150/products/product.html)] an acceleration sensor with which the feedback signal (high-impedance) is applied to the movable center plate of the sensor (reference sign $V_{FB}$ in FIG. 1). For reading out the sensor, a high frequent carrier signal (1 MHz) is applied to the fixed electrodes of the sensor ($+V_{mod}/-V_{mod}$), the position signal is detected as a change in voltage at the center plate. After demodulation with the carrier frequency as well as filtering, the measurement signal is available. This method can be designated also as frequency multiplexing.

Known solutions, however, have significant disadvantages.

Usually, in case of separate feedback electrodes, high voltages (>10V) are required at the feedback electrodes in order to imprint the required forces. As a separate high supply voltage usually is not available for the typical scopes of applications and/or is not desired, in ASIC implementations usually a combination of upwards converters (boost levels) and high voltage drivers are implemented.

As the feedback electrodes as described above also serve to the adjustment of the resonance frequency as well as to the compensation of the quadrature effect, a detailed calculation and adjustment of the respective required voltages is necessary, as described in the published German patent application DE 10 2011 005 745 A1, to avoid interdependencies. A sufficiently precise as well as performance efficient realization of the required voltages in the high voltage range is hardly possible.

Using separate feedback electrodes can moreover lead to natural frequencies of the electrodes, which may jeopardize the stability of the system, as described in the article Seeger, J. I.; Jiang, X.; Kraft, M. & Boser, B. E. "Sense Finger Dynamics in a Sigma-Delta Force-Feedback Gyroscope", Proc. Tech. Dig. Solid-State Sensor and Actuator Workshop, 2000, 296-299.

In order to realize time-multiplexing, usually switches are required in the signal path, as a switching between detection and feedback has to be realized.

As only a part of the clock cycle for applying the feedback forces can be used, respective higher forces have to be applied in order to achieve the same feedback effect. Furthermore, this kind of feedback ("Return-to-Zero") compared to consistently set up feedback signals ("Non-Return-to-Zero"), are more vulnerable in respect of clock frequency fluctuations (Clock-Jitter), as derivable from the article Cherry, J. A. & Snelgrove W. M.: Continuous-time Sigma-Delta modulators for high-speed A/D conversion, Kluwer Academic Publishers, 2000.

In addition, only a part of the clock cycle can be used for reading out the sensor. Thus, the information on the position of the sensor mass is not continuously available. As the position information e.g. when using the charge integrator takes place due to integration of the voltage caused by the sensor movement, the "gaps" in the movement information lead to a reduction of the signal amplitude as well as to a distortion of the position measurement.

The main disadvantage of the frequency multiplexing is the use of high frequent carrier signals. According to the above mentioned component ADXL50, e.g. a carrier signal with a frequency of 1 MHz is used at a bandwidth of 1 kHz.

As regarding rotation rate sensors, the signals to be measured are modulated upon the frequency of the primary oscillation ($f_d \approx 10$-$25$ kHz), a respective higher bandwidth and, thus, respective higher carrier frequencies would be necessary. By using sigma-delta control loops, signals with frequencies to up to a multiple of the primary frequency (e.g. $8*f_d$) of the detection circuit have to be collected possibly undisturbed. This could require a further increase of the carrier frequency.

Creating these high-frequent carrier signals increases the system's energy consumption. High-frequency signals, moreover, have to be shielded by respective measures in order not to cause interfering signals within the entire circuit.

During the application of rotation rate sensors, furthermore, the position of two oscillations (excitation oscillation and detection oscillation) is to be read out, whereby usually for both oscillating masses only a joint center plate is available. Thus, a feedback signal on the center plate would affect both oscillations (this is not desired) and for the detection several carrier signals would have to be applied.

SUMMARY

The objective technical problem in applying the invention is to provide the interface between the capacitive sensor and the electronics. Thereby, the circuit e.g. as charge integrator shall provide the position of the sensor mass as an electrical signal, as well as generate the feedback forces predetermined by the control loop in form of a voltage applied to the sensor electrodes. These two functionalities shall be performed simultaneously and without using carrier signals.

This technical problem is solved by the subject matter of the independent claims. Preferred embodiments of the subject matter according to the invention are indicated in the dependent claims.

The invention is based on the idea to modulate the voltage required for the creation of the feedback force to the input common mode of the read-out circuit for the detection of the displacement. Due to the change of the input common mode, the voltage across the detection capacity $C_{sense}$ is adjusted and, thus, a force on the secondary mass is applied. Ideally, thereby, the output voltage of the read-out circuit is not changed. The read-out circuit only detects the differential input signal, thus, the displacement.

In order to modulate the feedback voltage of the control loop to the input common mode, the feedback voltage $V_{fb}$ is applied at the positive input of an operational amplifier, which is connected with a charger integrator. This operational amplifier produces due to its feedback ($R_{fb}$, $C_{fb}$) a so-called virtual short between the positive and the negative input, i.e. the voltages at both inputs are identical apart from one control fault. This further feedback branch, thus, ensures on the one hand that the voltage at the second input is transmitted to the first input, and on the other hand, it serves to translate the displacements of the sensor, which at least lead to capacity changes, into a voltage. Along with the operational amplifier, the feedback branch, thus, assumes the actual detection. Preferably, the feedback branch comprises a capacity and a resistive element. The resistive element thereby can be formed by one or more ohmic resistances, one or more transistors, or another respective component. However, also only one capacity without separate resistive element or every other suitable form of feedback branch may be provided.

The change of the output voltage $V_{out}$ resulting from this displacement of the input common mode has to be compensated in order to avoid an influence of the position detection. This can be achieved by a compensation circuit at the negative input of the operational amplifier.

A further preferred embodiment comprises the extension of the presented concept to a fully differential charge integrator with integrated feedback. For this implementation, a fully differential "Differential Difference Amplifier" (DDA) is used. Furthermore, the feedback voltages $V_{fb,p}$ and $V_{fb,n}$ are fully differentially available. The feedback voltage $V_{fb,p}$ is modulated upon the input common mode of the positive and $V_{fb,n}$ is modulated upon the one of the negative signal path.

Different concepts for the required compensation were developed and are shown in the following.

BRIEF DESCRIPTION OF THE DRAWINGS

For a better understanding of the present invention, this is illustrated by means of the embodiments shown in the following Figures, wherein some of the features or feature combinations from the different embodiments shown may constitute per se independent, inventive solutions or solutions according to the invention.

It is shown in FIG. 1 a schematic sketch of an acceleration sensor with movable center plate (at the seismic mass) and fixed outer electrodes.

DETAILED DESCRIPTION OF THE EMBODIMENT(S)

Figure 1:
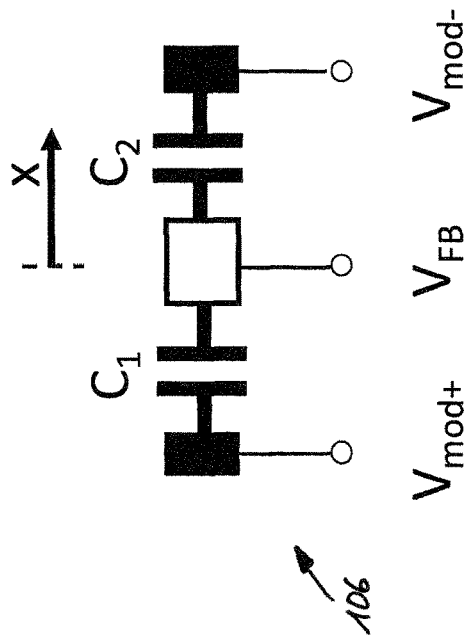
Figure 2:
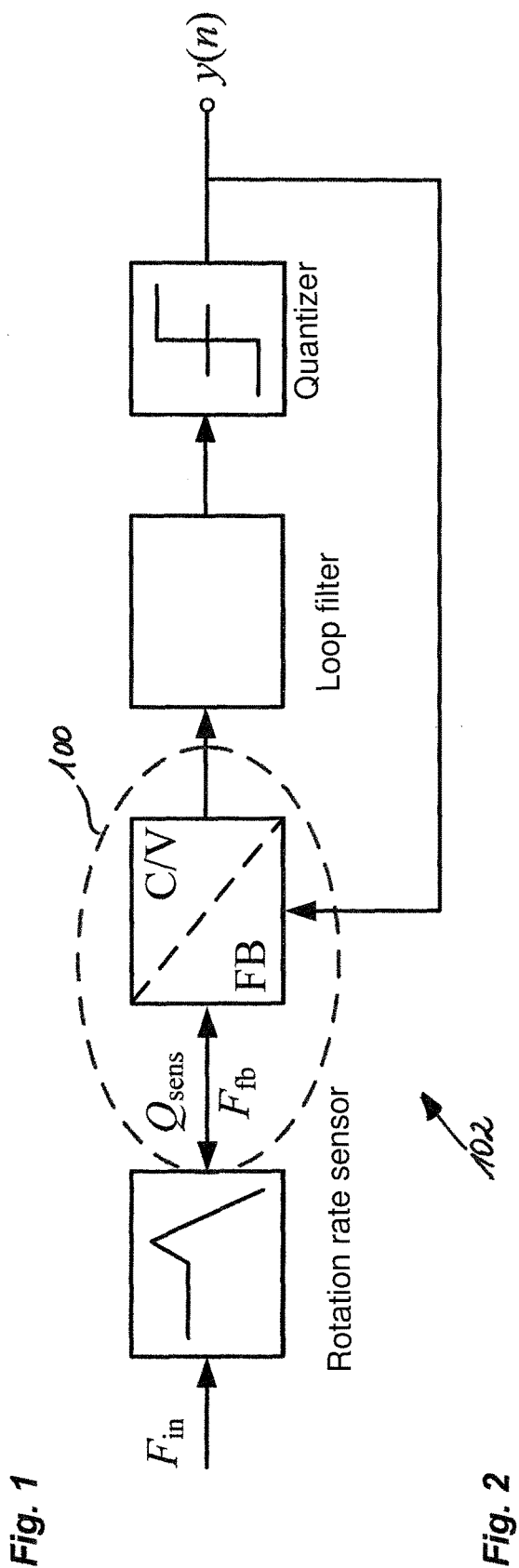
FIG. 2 an overview display of an entire system of an electro-mechanical sigma-delta modulator with the suggested circuit for detection (C/V) and feedback (FB)

In the following, the present invention is described in detail with reference to the Figures. FIG. 2 thereby shows the circuit according to the invention in its application environment, whereby the suggested circuit 100 for the detection (C/V) and the feedback (FB) is encircled with a dotted line in the entire system of an electro-mechanical sigma-delta modulator 102. Basically, the principles of the present invention, however, are applicable to other kinds of closed control loops for the readout and operation of capacitive sensors.

According to the invention, the voltage required for the creation of the feedback force is modulated upon the input common mode of the readout circuit for the detection of the displacement. Due to the change of the input common mode, the voltage across the detection capacity $C_{sense}$ is adjusted and, thus, a force is applied to the secondary mass. Ideally, thereby the output voltage of the readout circuit does not change due to the change of the input common mode. The readout circuit only detects the differential input signal and, thus, the displacement.

Figure 3:
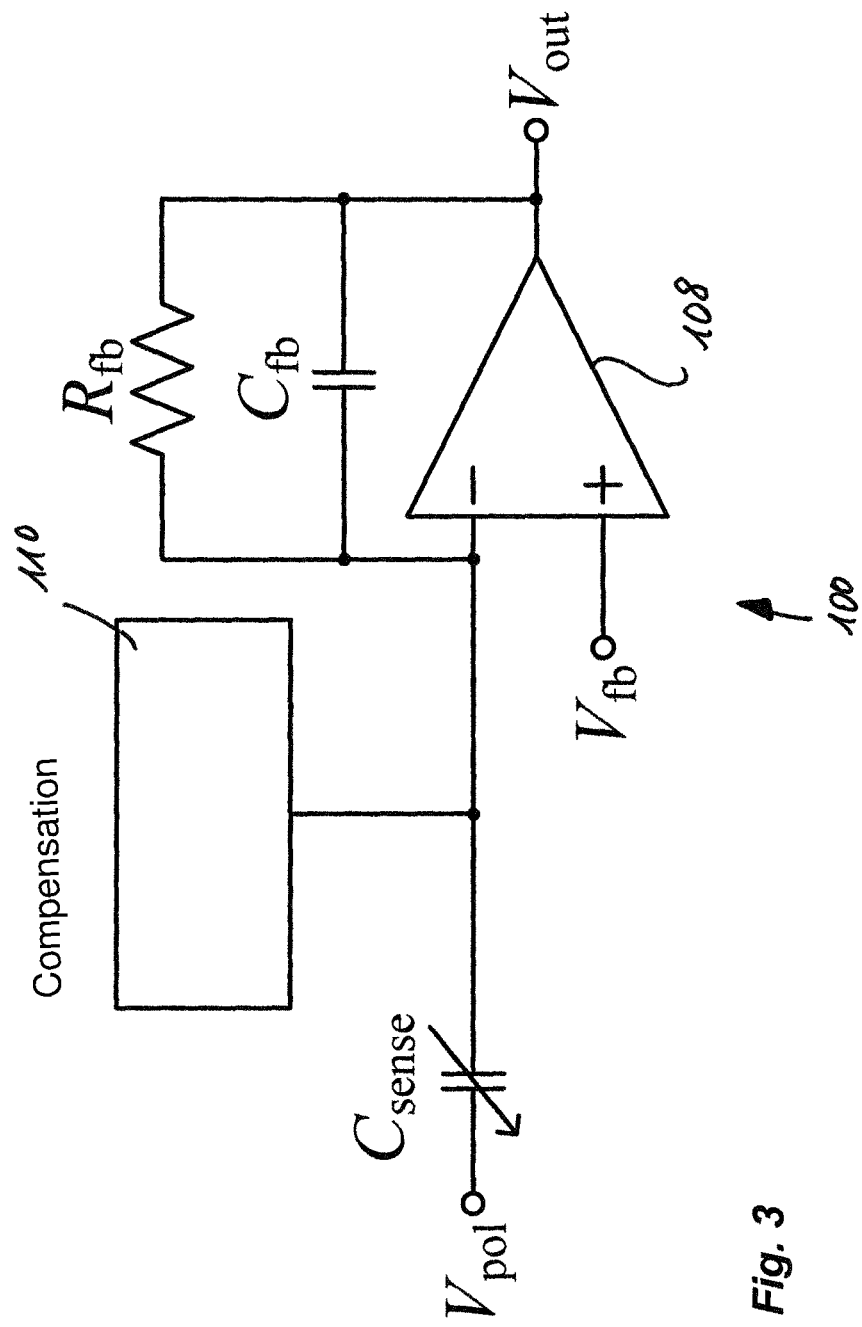
FIG. 3 a circuit diagram of the suggested concept for time continuous detection and feedback.

FIG. 3 schematically shows the suggested concept for the time continuous detection and feedback.

In order to modulate the feedback voltage of the control loop to the input common mode, the feedback voltage $V_{fb}$ is applied at the positive input of an operational amplifier 108 which is connected to a charge integrator. This operational amplifier 108 creates a so-called virtual short due to its feedback ($R_{fb}$, $C_{fb}$) between the positive and the negative input, i.e. die voltages at both inputs are identical apart from one control fault. The change of the output voltage $V_{out}$ resulting from this displacement of the input common mode has to be compensated in order to avoid an influence of the position detection. This can be achieved by a compensation circuit 110 at the negative input of the operational amplifier 108.

Figure 4:
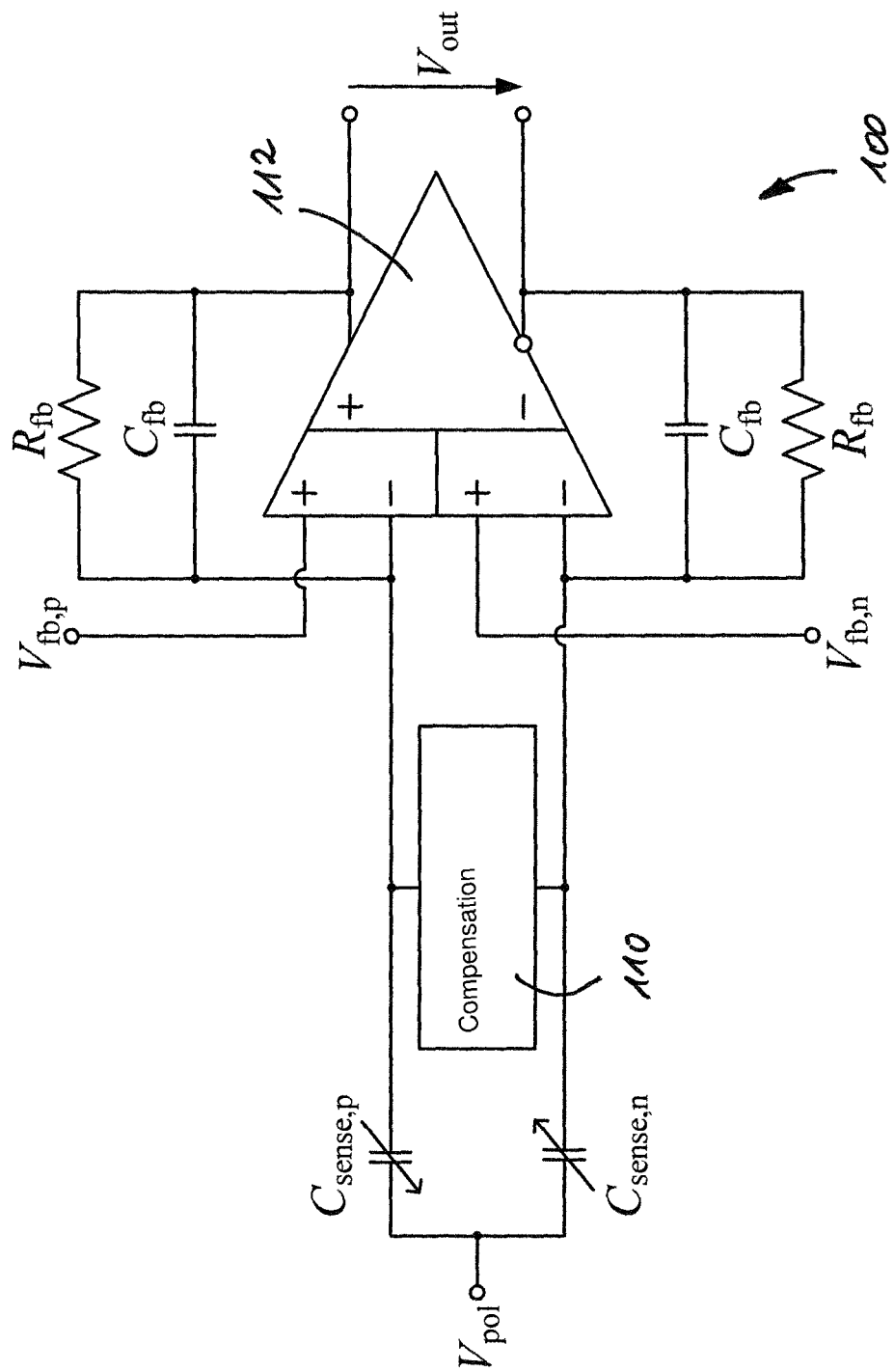
FIG. 4 a schematic display of the extension of the concept for time continuous detection and feedback at a fully differential approach.

FIG. 4 shows the extension of the presented concept to a fully differential charge integrator with integrated feedback. For this implantation, a fully differential "Differential Difference Amplifier" (DDA) 112 is used. Furthermore, the feedback voltages $V_{fb,p}$ and $V_{fb,n}$ are fully differentially available. The feedback voltage is modulated upon the input common mode of the positive and $V_{fb,n}$ is modulated upon the one of the negative signal path.

For the required compensation different concepts can be used.

Figure 5:
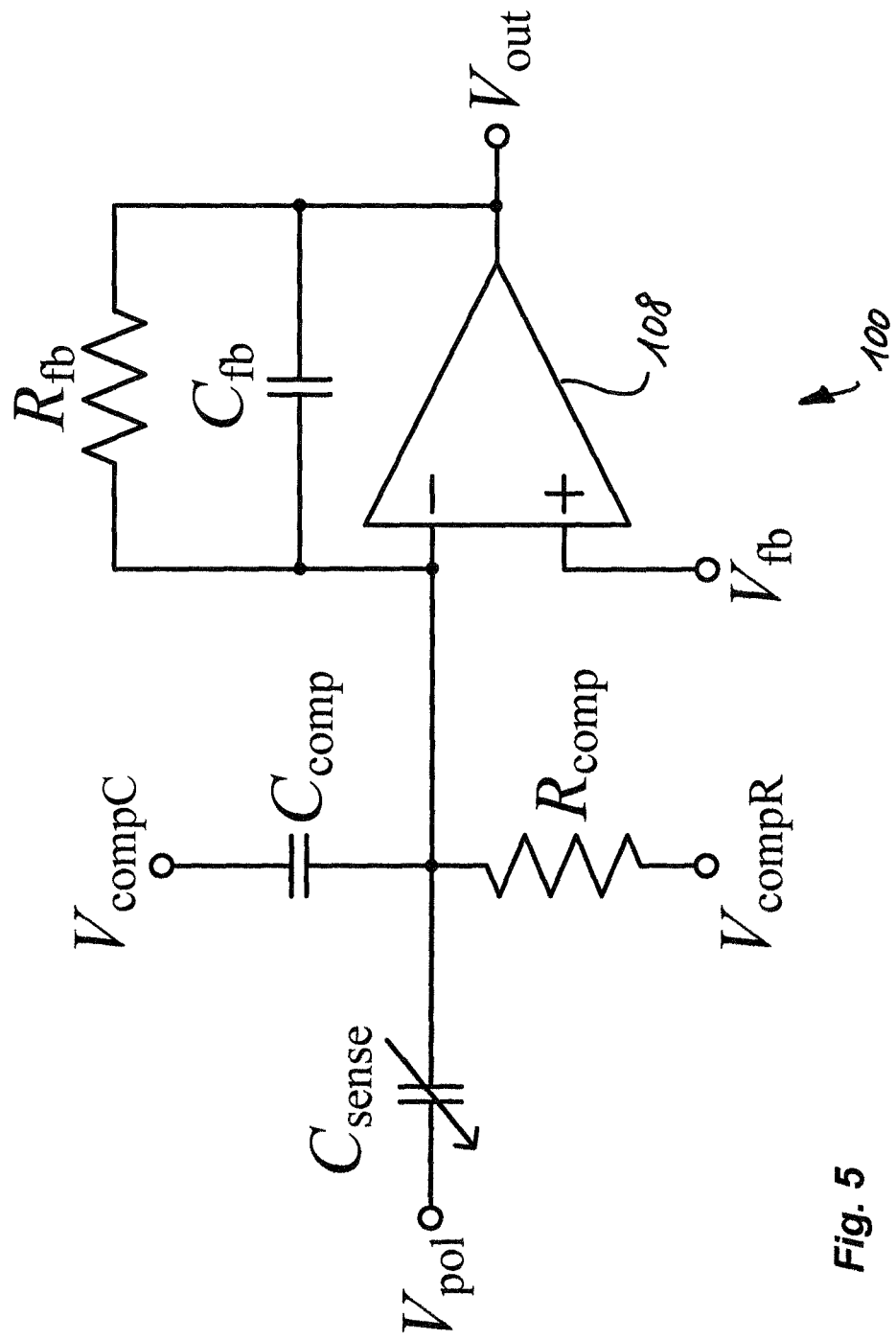
FIG. 5 a circuit diagram of the easiest resistive and capacitive compensation.

In the easiest embodiment the compensation network 110 consists of a resistance $R_{comp}$ and a capacity $C_{comp}$. To these a compensation voltage $V_{compR}$, and/or $K_{compC}$ is applied so that upon a change of the input common mode, a change of the output voltage of the charge integrator 108 is suppressed. FIG. 5 shows a circuit illustration of the easiest resistive and capacitive compensation.

The resistive compensation ($R_{comp}$ and $V_{compR}$) has to compensate the current flow due to the change of the input common mode due to the feedback resistance $R_{fb}$ of the charge integrator 108. The amount of the compensation current is determined via the amplitude of the resistive compensation voltage $\Delta V_{compR}$ and via the compensation resistance $R_{comp}$.

The capacitive compensation has to provide the required charge in order to load the capacitive charge at the negative input of the charge integrator to the new input common mode. This charge can be adjusted via the factor of the compensation capacity $C_{comp}$ and by means of the amplitude of the compensation voltage $\Delta V_{compC}$.

The conditions, which have to be fulfilled for an aligned resistive as well capacitive compensation, are summarized in the following (Equations 2 and 3).

For an aligned resistive compensation, the following relation of the amplitude of the feedback voltage $\Delta V_{fb}$ zu $\Delta V_{compR}$ has to be observed:

$$\Delta V_{fb}/\Delta V_{compR}=R_{fb}/(R_{fb}+R_{comp}). \qquad \text{Equation 2}$$

For an aligned capacitive compensation, the following equation has to be fulfilled:

$$C_{comp}\Delta V_{compC}=(C_{comp}+C_{sense}+C_{fb}+C_{para})\Delta V_{fb}. \qquad \text{Equation 3}$$

Thereby, $C_{para}$ includes all parasitic capacities at the negative input of the charge integrator.

For the case of a sigma-delta modulator as control loop, for $V_{compR}$ and $V_{compC}$, a squarewave signal may be used in the phase with the feedback signal $V_{fb}$.

Figure 6:
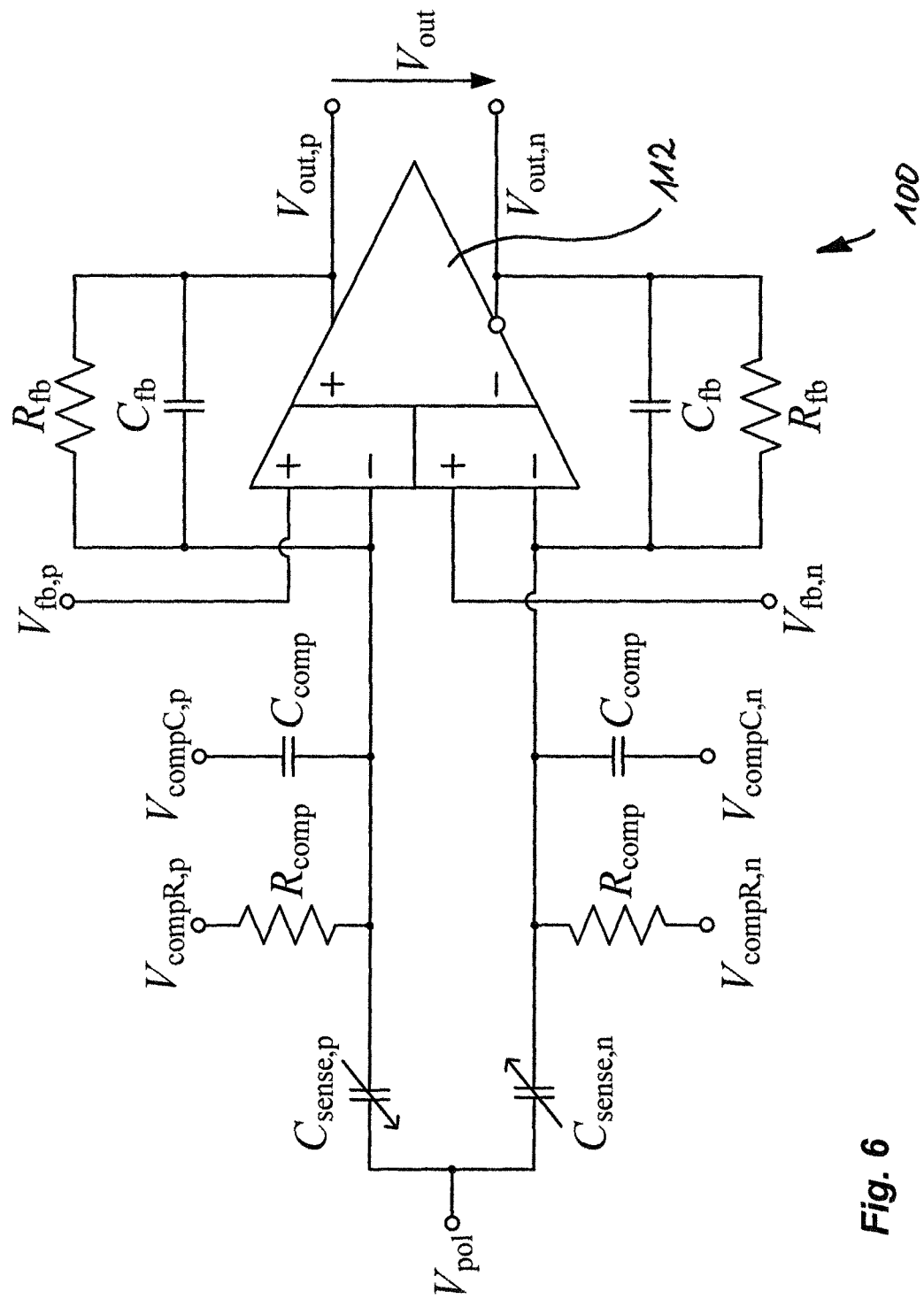
FIG. 6 the extension of the circuit from FIG. 5 regarding a fully differential charge integrator with simple compensation circuit.

In FIG. 6, the fully differential extension of the compensation network 110 from FIG. 5 is shown. The compensation voltages ($V_{compR,p}$, $V_{compR,n}$ und $V_{compC,p}$, $V_{compC,n}$) are fully differentially available.

According to a preferred embodiment of the present invention, an automatic compensation adjustment is made in case of using a sigma-delta modulator. In the following, this is described in detail.

Due to the unknown parasitic capacities at the negative input knot of the charge integrator, an automatic capacitive compensation adjustment is preferable. For this, the influence of a capacitive mis-reconciliation at the output of the charge integrator is detected.

Figure 7:
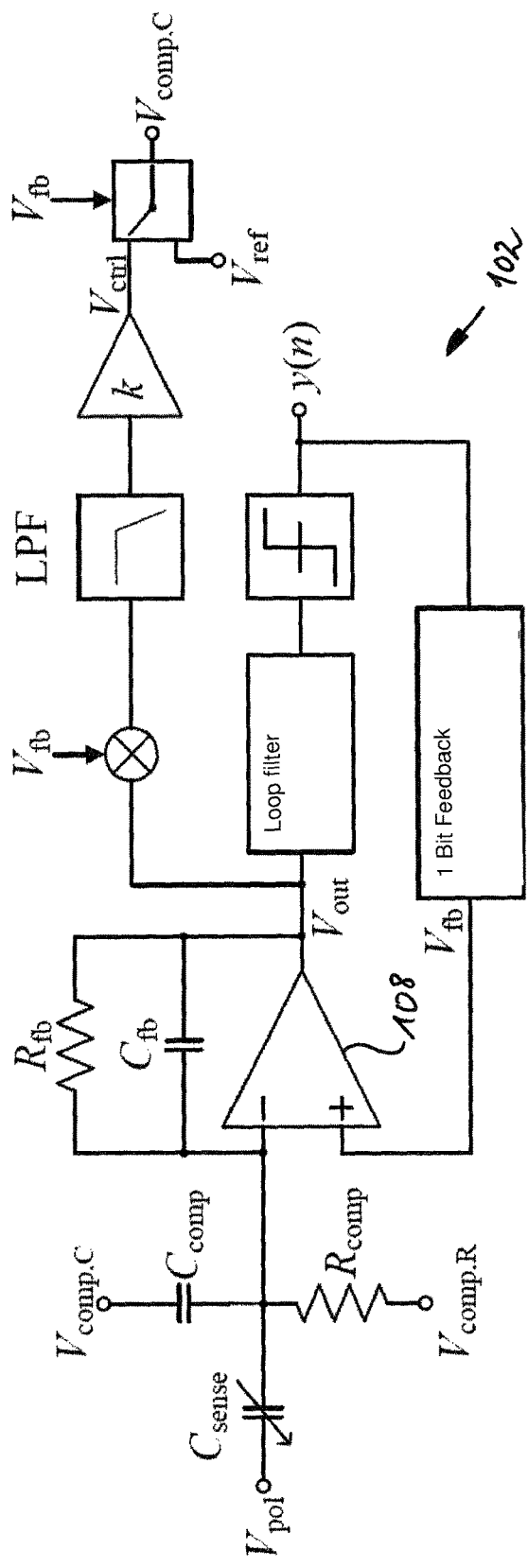
FIG. 7 an illustration of the electro-mechanical sigma-delta modulator with the concept for automatic compensation adjustment.

A capacitive mis-reconciliation causes an interfering signal at the output of the charge integrator 108, which is correlated with feedback signal of the sigma-delta modulator 12. After mixing the output voltage $V_{out}$ of the charge integrator 108 with the output signal y(n) of the sigma-delta modulator and subsequent low-pass filtering (LPF), a voltage is generated, which constitutes a measure for the capacitive mis-reconciliation (FIG. 7). This concept of separating the interfering signal from the actual output signal originates from the earlier publication of the Fritz-Hüttinger professorship for microelectronic, namely the article Northemann, T; Maurer, M.; Manoli, Y. "Compensation Technique for Capacitive Crosstalk in Continuous-Time Electro-Mechanical Sigma-Delta Modulators", Proceedings of the Eurosensors Conference, 2011: 1281-1284.

A controller corrects the amplitude of the feedback voltage in a manner that the mis-reconciliation is minimized.

Thereby, the squarewave signal is generated by switching between the output voltage of the controller $V_{ctrl}$ and a determined reference potential $V_{ref}$. FIG. 7 shows a first embodiment of the electro-mechanical sigma-delta modulator with the concept for automatic compensation adjustment.

Figure 8:
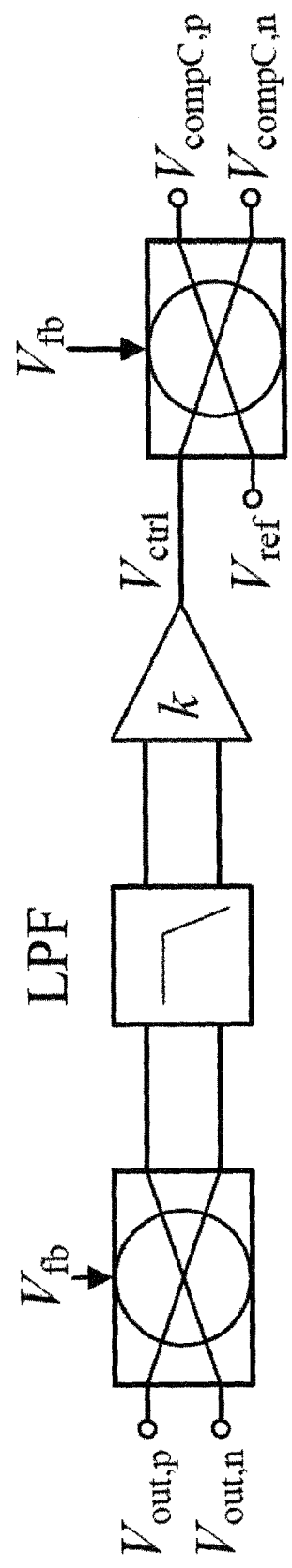
FIG. 8 an extension of the control concept from FIG. 7 for the fully differential charge integrator from FIG. 6.

The extension of the regulation for the fully differential charge integrator as shown in FIG. 6 is shown in FIG. 8. Due to this regulation, the fully differential capacitive compensation voltages $V_{compC,p}$ and $V_{compC,n}$ are generated.

For the resistive compensation, a regulation is not required. As the negative input knot of the charge integrator is high-impedance, only the known current has to be compensated by the feedback resistance $R_{fb}$ of the charge integrator.

Figure 9:
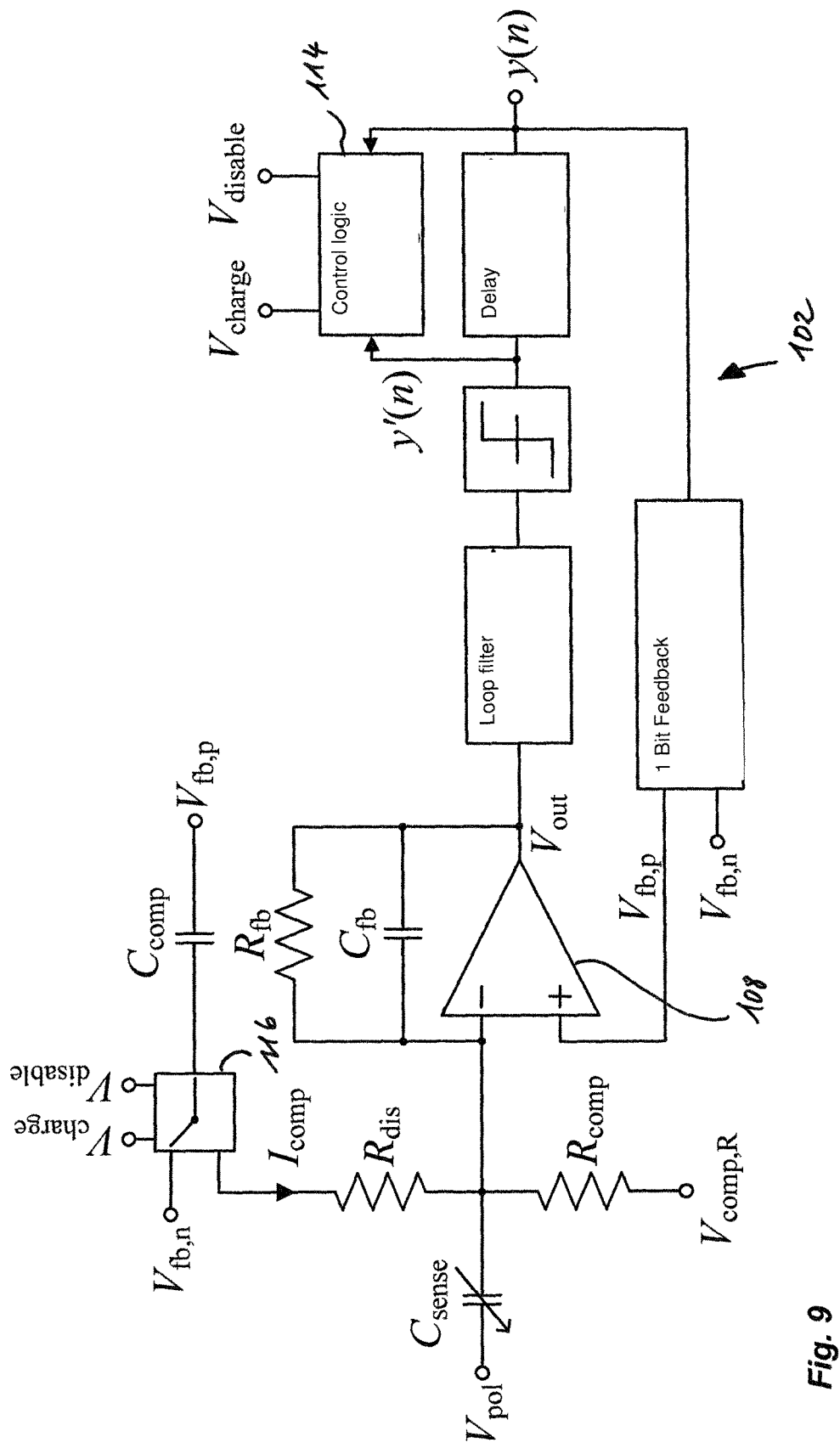
FIG. 9 an illustration of the electro-mechanical sigma-delta modulator with the concept, with which the capacitive compensation is performed with the charge stored on. $C_{comp}$.

A further preferred embodiment uses a switched capacitive compensation. According to this compensation method, the creation of an additional capacitive compensation voltage is omitted. Due to the use of already present voltages, the energy consumption can be reduced. FIG. 9 shows an illustration of the electro-mechanical sigma-delta modulator with the concept, with which the capacitive compensation with the charge stored on $C_{comp}$ is performed.

The charge, which is required for the capacitive compensation is provided by pre-charging of a capacitor. This capacitor $C_{comp}$ is charged with the already present fully differential feedback voltage $V_{fb,p}$ and $V_{fb,n}$ (FIG. 9). If the output of the sigma-delta modulator y(n) and, thus, the feedback voltages $V_{fb,n}$ und $V_{fb,p}$ change, a compensation has to be carried out. For this, the capacitor $C_{comp}$ is connected with the negative input of the charge integrator 108. The compensation charge stored in the capacitor is thereby transmitted to the negative input knot.

The switching operations are performed by means of a switchgear unit 116 and are controlled by a simple digital control logic 114. This detects the change of the output signals of the sigma-delta modulator y(n) and respectively places the control signals $V_{charge}$ und $V_{disable}$.

For the resistive compensation furthermore the generation of a compensation voltage $V_{compR}$ is required.

Figure 10:
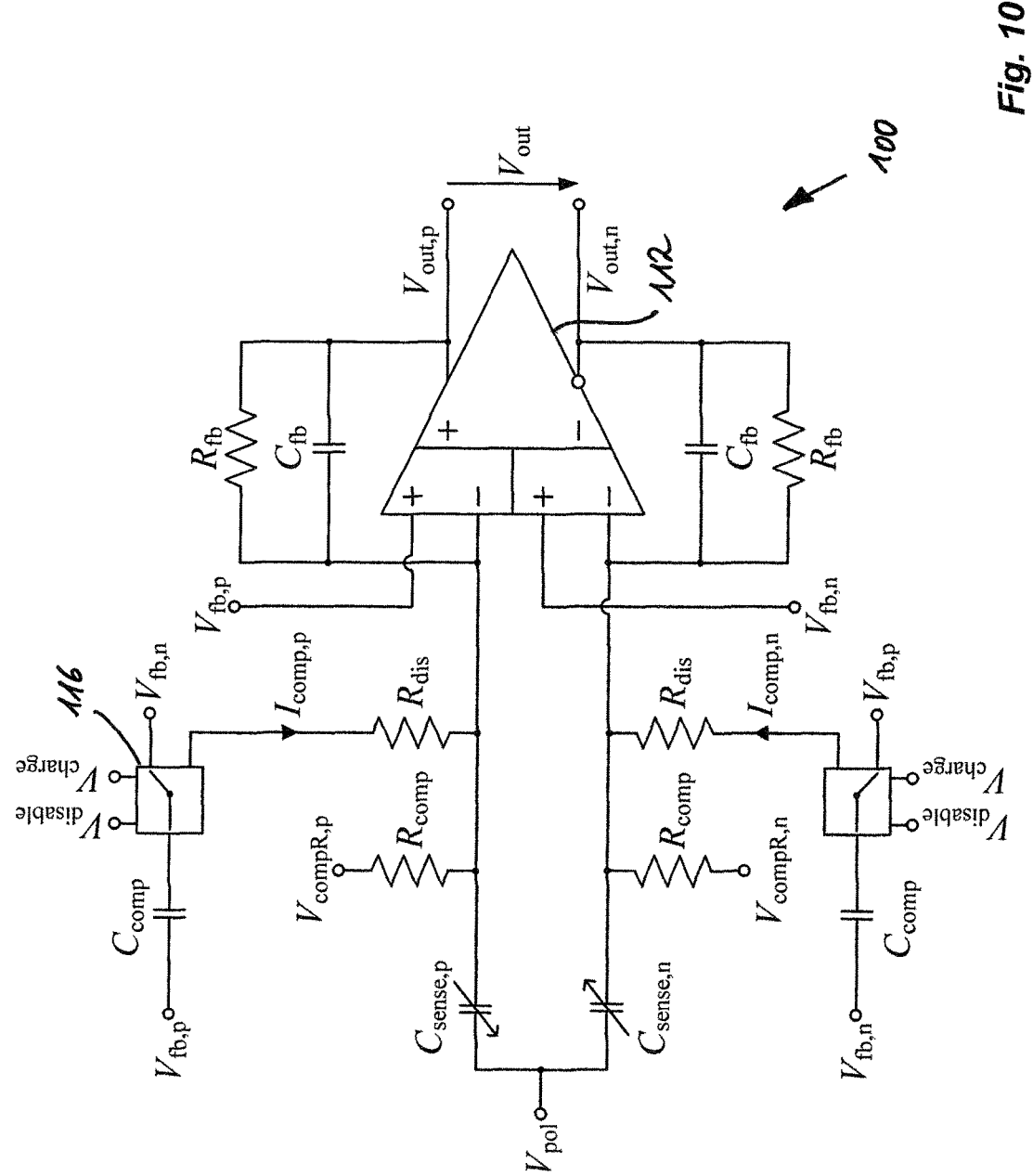
FIG. 10 a circuit diagram of the fully differential charge integrator, with which the capacitive compensation with the charge stored on $C_{comp}$ is performed.

The extension of this concept to a fully differential charge integrator 112 with switched capacitive compensation is shown in FIG. 10, which illustrates a circuit diagram of the fully differential charge integrator, in which the capacitive compensation is performed with the charge stored on $C_{comp}$.

A further preferred embodiment of the present invention relates to the pre-charging of the sensor capacitors. With respect to FIGS. 11 to 14, a method is described by which it is allowed for the compensation to hide the sensor capacity $C_{sense}$ as well as the unknown parasitic capacities of the rotation rate sensor $C_{para}$,s. This method can be used for the above described concepts and is based on a technique, which is used in order to protect the charge integrator against capacitive crosstalk.

Figure 11:
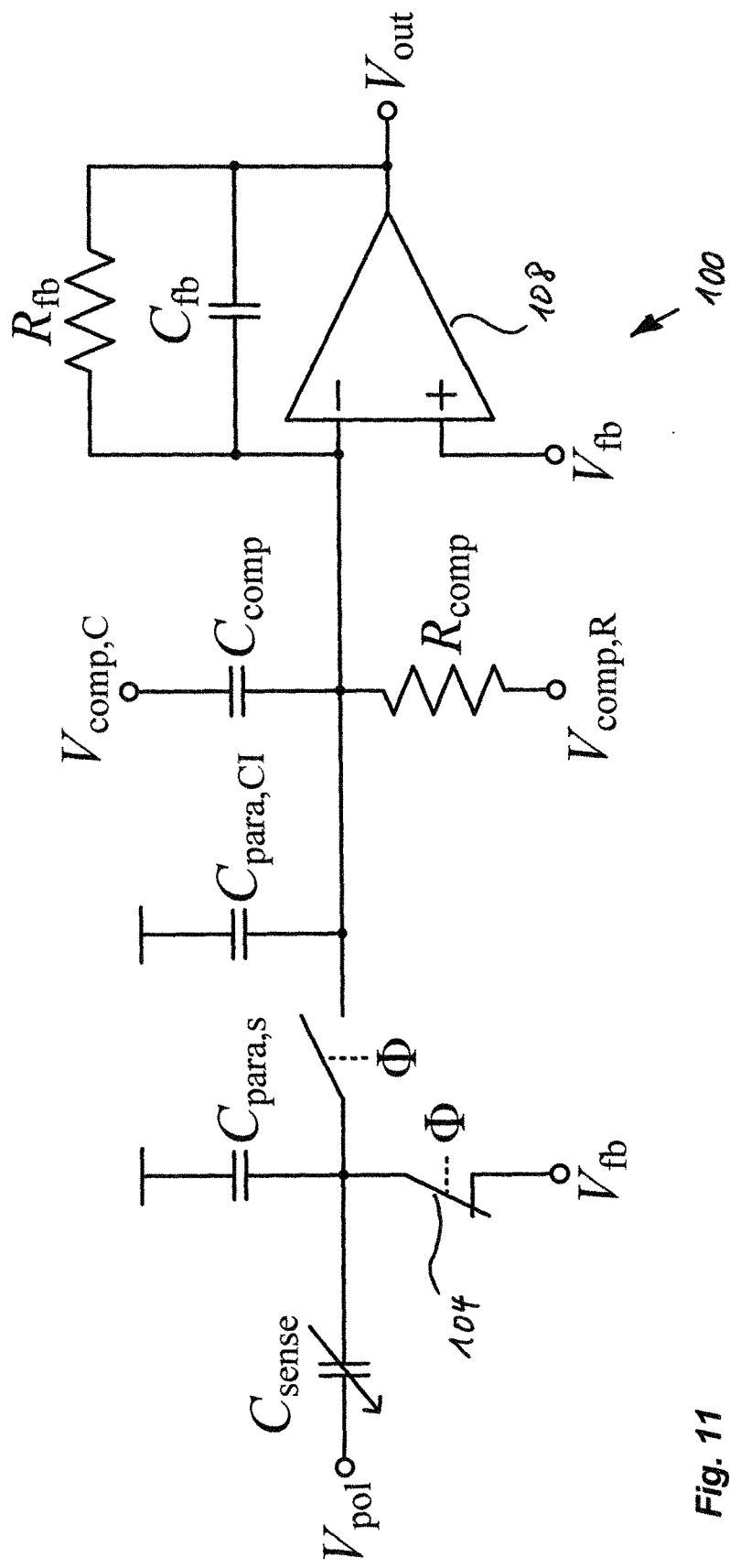
FIG. 11 a circuit diagram, in which the charge integrator periodically is briefly separated from the charge integrator with the control signal Φ.

In this technique, at least one switch 104 between the sensor 106 and the charge integrator 108 is incorporated. Upon every possible switch of the feedback voltage $V_{fb}$, the sensor is shortly separated from the charge integrator and connected with the feedback voltage. In contrast to the time-multiplexing method, hereby, the feedback takes place during substantially all the time and the charge integrator is only as long separated from sensor, as this is necessary for the transshipment of the capacitors (usually some percent of the clock cycle). This switching is carried out with the control signal Φ. While the sensor is separated from the charge integrator, the sensor capacity $C_{sense}$ and the large parasitic capacity $C_{para,s}$ is charged to the new feedback voltage (FIG. 11). The required charge is here not supplied by the capacitive compensation. Therefore, the capacities have not to be considered for the capacitive compensation. The parasitic capacities at the input knots of the charge integrator $C_{para,CI}$ are thereby strongly diminished in comparison to the presented concepts without separation of the charge integrator.

The resulting reconciliation condition for the capacitive compensation is listed in equation 4:

$$C_{comp}\Delta V_{compC}=(C_{comp}+C_{fb}+C_{para,CI})\Delta V_{fb}. \quad \text{Equation 4}$$

Figure 12:
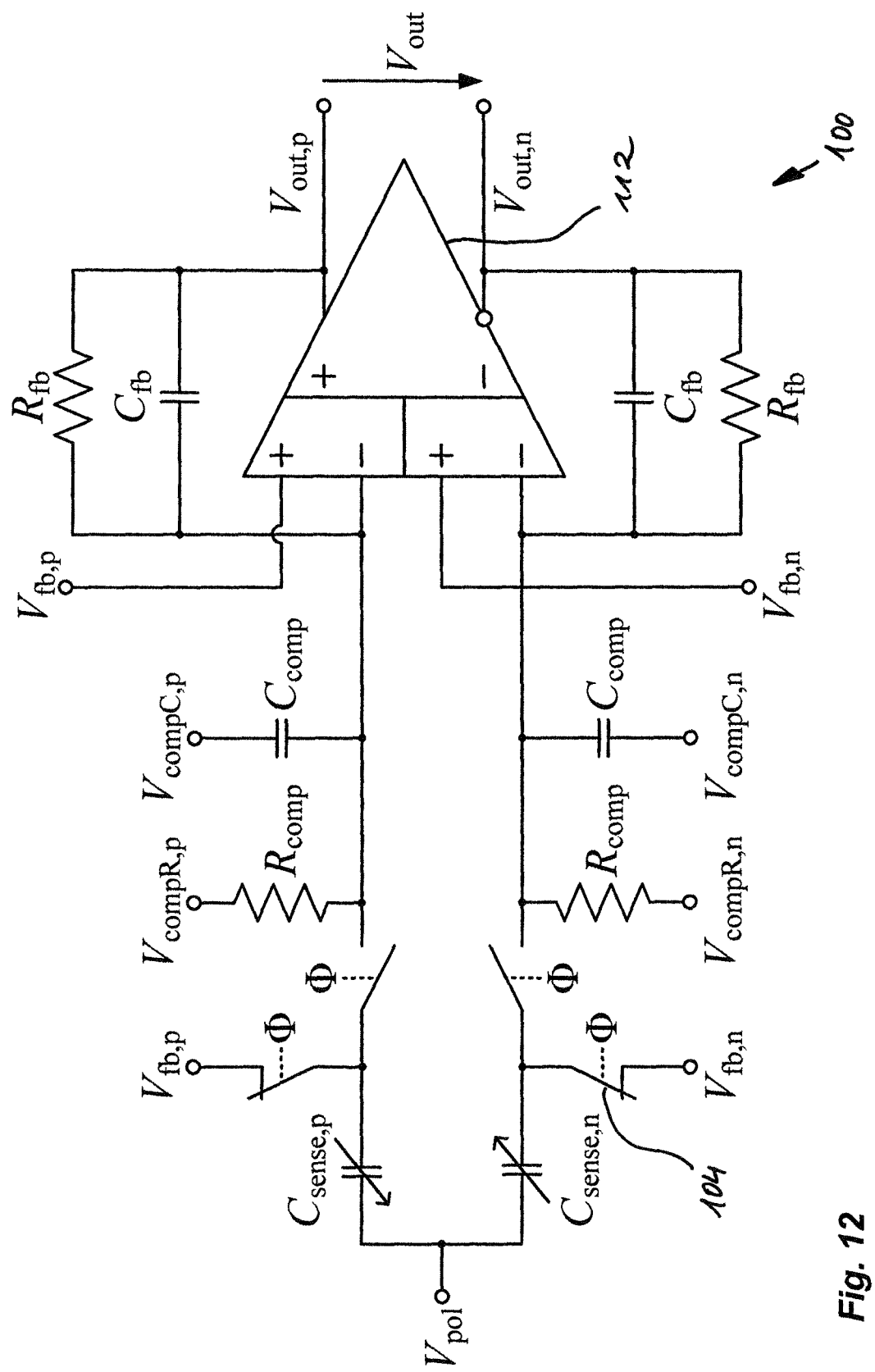
FIG. 12 a circuit illustration of the fully differential embodiment of the concept shown in FIG. 11 for reduction of the influence of parasitic capacities to the compensation.

The embodiment for the fully differential charge integrator 112 is shown in FIG. 12. Here, the sensor capacities of the positive ($C_{sense,p}$) and the negative ($C_{sense,n}$) signal path are pre-charged with the respective feedback voltage ($V_{fb,p}$ bzw. $V_{fb,n}$) and subsequently are connected to the charge integrator 112. The parasitic capacities of the sensor and at the input of the charge integrator are not shown in order to simplify the illustration. As shown in FIG. 11, the charge integrator periodically is separated shortly from the sensor with the control signal Φ. The parasitic capacities which have to be considered for the compensation, are diminished. FIG. 12 shows the respective circuit diagram of the fully differential embodiment of the concept shown in FIG. 11 for reduction of the influence of parasitic capacities to the compensation.

In the following, the influence of a mis-compensation to the noise in the signal tape (IBN "In Band Noise") shall be exemplarily shown for a bandpass sigma-delta modulator of sixth order. For this, ideal compensation voltages $V_{compR}$ and $V_{compC}$ are assumed. The mis-reconciliation is translated to the compensation resistance $R_{comp}$, and/or the compensation capacity $C_{comp}$.

For the calculation of the resistive mis-reconciliation, the deviation of the compensation resistance to the feedback resistance is standardized. This is described by $k_R$:

$$k_R(R_{comp}-R_{fb})/R_{fb}. \quad \text{Equation 5}$$

A resistive mis-reconciliation of $k_R<0.1$ can easily be achieved. In this range the noise in the signal tape hardly deteriorates (Table 1). The achieved IBN is below the limiting electrical noise of the circuit, which approximately is at −90 dbFS.

TABLE 1

Influence of a resistive mis-reconciliation to the noise in the signal tape

| | | | | $k_R$ | | | | |
|---|---|---|---|---|---|---|---|---|
| −0.2 | −0.1 | −0.05 | −0.01 | 0 | 0.01 | 0.05 | 0.1 | 0.2 |
| IBN/dBFS −117 | −116 | −118.4 | −117 | −118.5 | −117.5 | −117.7 | −117.3 | −112.3 |

For the capacitive mis-reconciliation, the deviation of the compensation capacity $C_{comp}$ from the ideal compensation is determined and standardized to the feedback capacity $C_{fb}$.

Under the assumption that the amplitude of the capacitive compensation voltage $\Delta V_{compC}$ is twice as big as the amplitude of the feedback voltage $\Delta V_{fb}$, $k_C$ describes the mis-reconciliation.

$$k_C=(C_{comp}-C_{fb}-C_{sense}-C_{para})/C_{fb} \quad \text{Equation 6}$$

In Table 2, the noise in the signal tape is listed depending on $k_C$. Here, as well, the entire system is robust vis-à-vis the mis-reconciliation. Values of $|k_C|<0.1$ may be achieved by controlling the amplitude of the compensation voltage $\Delta V_{compC}$ or by digitally configurable compensation capacities $C_{comp}$.

TABLE 2

Influence of a capacitive mis-reconciliation shown by $k_C$ to the noise in the signal tape

| | | | | $k_C$ | | | | |
|---|---|---|---|---|---|---|---|---|
| −0.2 | −0.1 | −0.05 | −0.01 | 0 | 0.01 | 0.05 | 0.1 | 0.2 |
| IBN/dBFS −120 | −122.6 | −121.3 | −116.7 | −118.5 | −117.5 | −115.7 | −112.7 | −108.6 |

Figure 13:
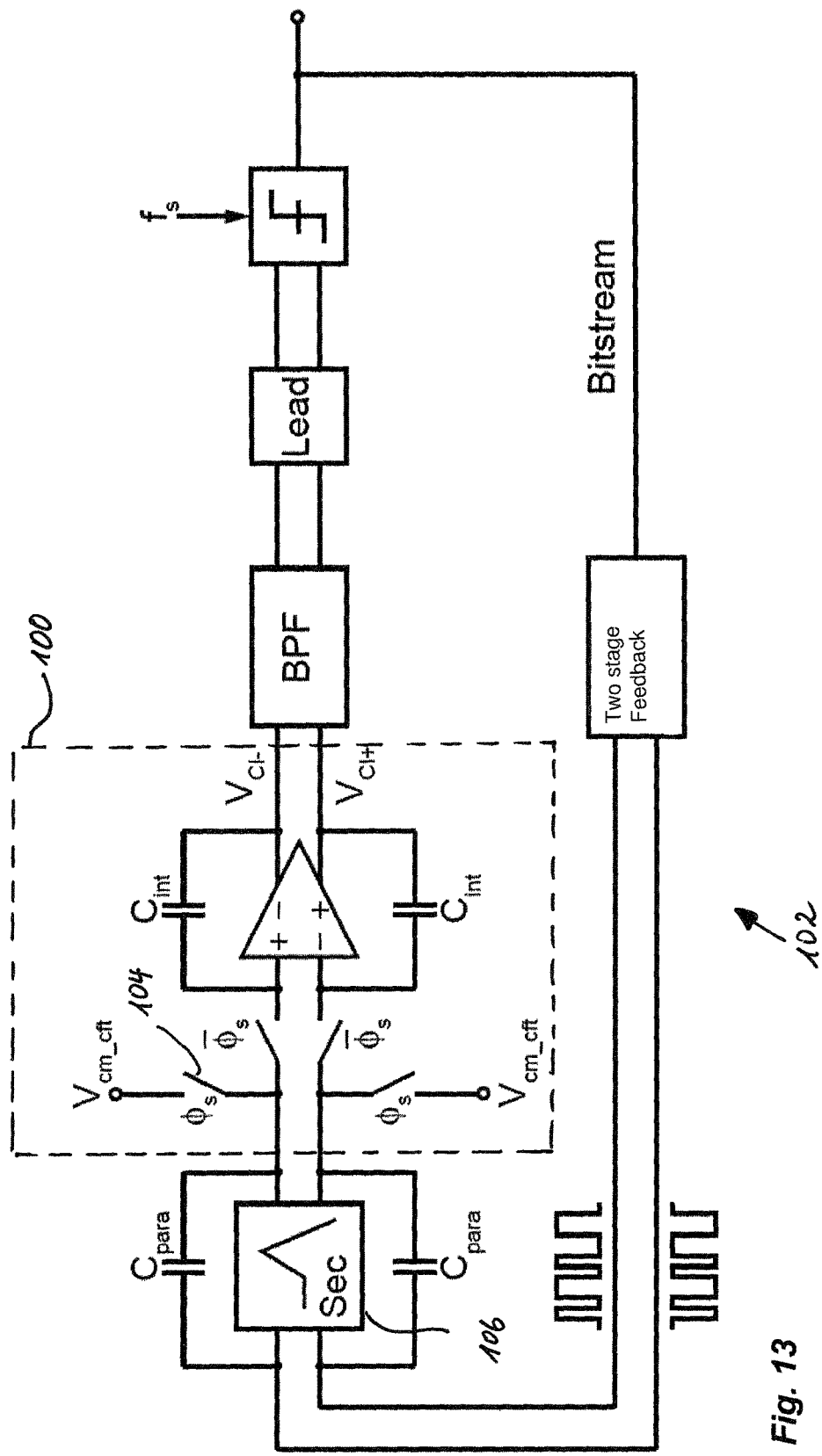
FIG. 13 an electro-mechanical sigma-delta modulator with capacitive switchable crosstalk correction.

FIG. 13 shows a further embodiment of a sigma-delta modulator 102 with a fully differential detection circuit 100 and a switched compensation of the parasitic capacities of the rotation rate sensor. As shown in FIG. 13, four switches 104 are incorporated in order to compensate the influence of the parasitic capacities. The switches 104 separate the input of the detection circuit 100 from the sensor 106 every time when the comparator output of the sigma-delta modulator changes. Simultaneously, the output of the sensor 106 is connected to the knot $V_{cm\_Cfb}$, which is on a potential with half of the supply voltage. During this separation, which occurs approximately during one percent of the sampling period $T_S$ ($T_S=1/f_S$), all parasitic charges on this reference knot are shorted instead of flowing to the input knot of the charge integrator. After this short separating, the input of the detection circuit 100 is again connected to the sensor in order to collect the sensor signal.

Figure 14:
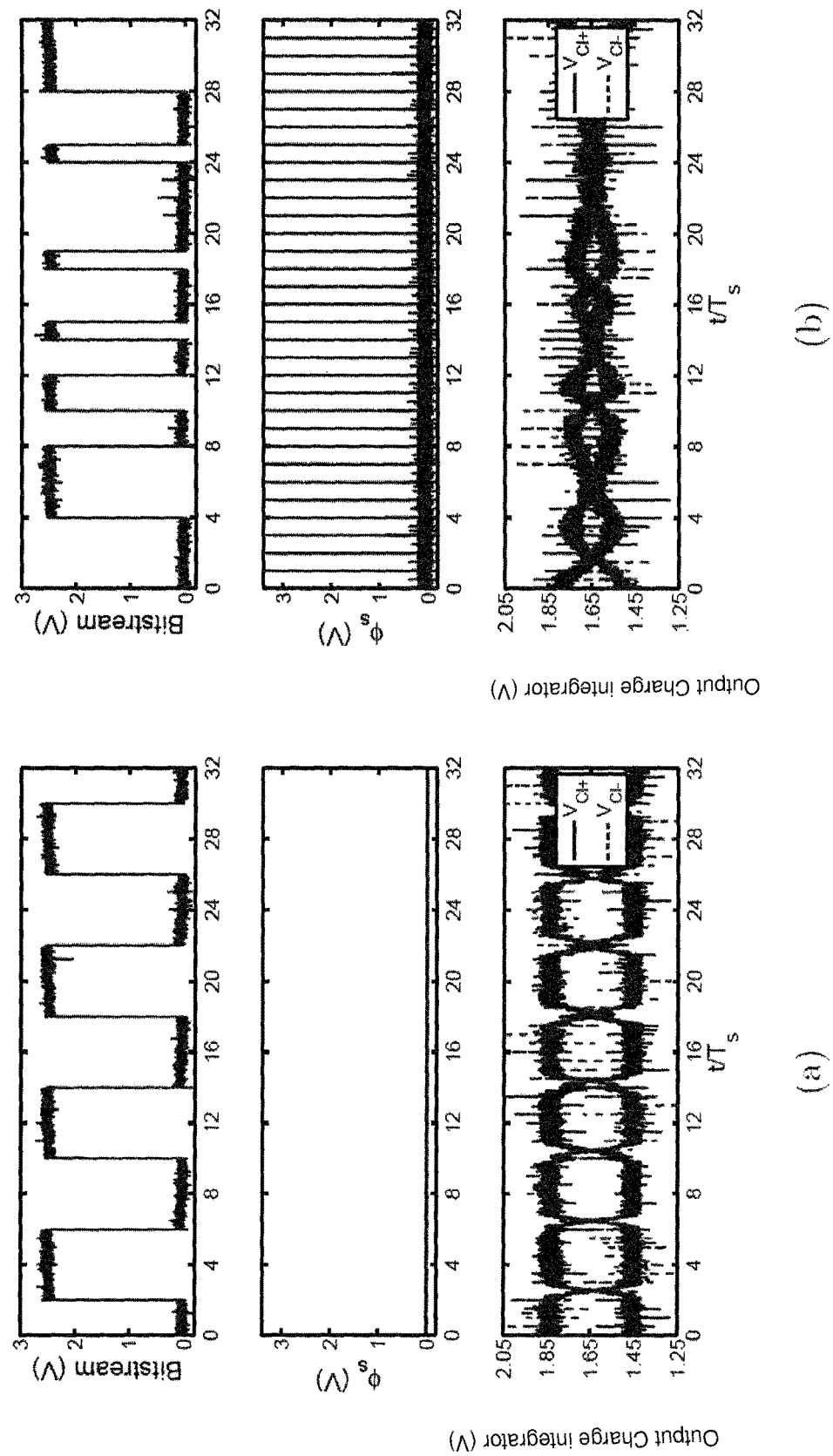
FIG. 14 measurement results (a) without (b) with the capacitive switchable crosstalk correction.

FIG. 14 shows exemplary measurement results, which are achieved with the sigma-delta modulator. Thereby, FIG. 14(a) shows the case, in which the separating technique according to FIG. 13 is not applied and FIG. 14(b) shows the case of a stable modulator behavior due to the separating technique of FIG. 13.

As shown in FIG. 14(a), in the undermost graphic showing the charge integrator output, crosstalk effects are apparent due to the bitstream and the parasitic capacities. In contrast thereto, according to FIG. 14(b), every time the comparator of the sigma-delta modulator is sampled, a positive separating signal $f_S$ is created, which is applied to the switches, even if no change at the comparator output designated with bitstream occurs. In this way, the separating signal Φs from the sampling frequency $f_S$ of the comparator can be differentiated and it is not necessary to provide an additional detection circuit collecting the actual switch of the comparator output. The charge integrator output signals in FIG. 14(b) are in the range of the common mode without signal drops. This shows a stable sigma-delta operation. As the force-feedback signals may also cause Charge crosstalk to the primary detection knots, the drive control loop should also include this technique.

The procedure to separate the sensor from the detection circuit by controlled switches and to connect it with the common mode voltage can be on the one hand, as shown in FIG. 13 used with the non-collocated feedback technique and on the other hand with the collocated feedback technique.

Summarized, the present invention offers the advantage that the possibility is created to simultaneously read out the sensor and to imprint feedback forces to the same electrodes without having to use time multiplexing or high-frequent carrier signals. The lower requirements for the charge integrator in the presented concept resulting therefrom vis-à-vis the implementation in the switch-capacitor technique offers the possibility to reduce the energy consumption of the readout circuit. In comparison to sensors with separate electrodes for detection and feedback, there is the possibility to reduce the sensor surface.

For the adjustment of the required compensation voltages, an automatic reconciliation is possible. Due to the embodiment of the system as electro-mechanical bandpass sigma-delta modulator, the system is sufficiently robust in respect to mis-adjustments.

The invention claimed is:

1. Detection circuit for reading out at least one position signal of a micromechanical capacitive sensor with at least one oscillating element that can be excited so as to move in an oscillating manner,
   wherein a first input connection of the detection circuit (100) during operation is connected to at least one output connection of the capacitive sensor (106) and one output connection of the detection circuit (100) during operation is connected with a loop filter of a control loop (102), whereby the control loop feeds back a feedback voltage depending on an output voltage of the control loop (102) to a second input connection of the detection circuit (100), so that a feedback force is applied to the capacitive sensor (106),
   wherein the detection circuit (100) at least comprises a further feedback branch ($R_{fb}$, $C_{fb}$) and the output voltage of the control loop (102) is modulated onto an input common mode of the detection circuit.

2. Detection circuit according to claim 1, wherein the feedback voltage is applied to a positive input of an operational amplifier (108) which is connected to a charge integrator.

3. Detection circuit according to claim 2, wherein the further feedback branch has a parallel circuit comprising a feedback resistance element ($R_{fb}$) and a feedback capacitor ($C_{fb}$).

4. Detection circuit according to claim 2, wherein the detection circuit (100) further has a compensation circuit (110) for compensating a change of an output voltage of the operational amplifier due to a displacement of the input common mode.

5. Detection circuit according to claim 4, wherein the compensation circuit (110) has a compensation capacity, which has a first connection with the first input connection of the detection circuit and a second connection with a capacitive compensation voltage.

6. Detection circuit according to claim 1, wherein the detection circuit has a fully differential charge integrator (112) with two negative inputs for collecting the changes of capacity of two coupled differential capacities of the capacitive sensor, and wherein two further feedback branches are provided.

7. Detection circuit according to claim 6, wherein each of the feedback branches ($R_{fb}$, $C_{fb}$) has a parallel circuit comprising a feedback resistance and a feedback capacitor.

8. Detection circuit according to claim 6, wherein a compensation circuit (110) is connected with each of the two negative inputs of the fully differential charge integrator (112), the compensation circuit for compensating a change of the output voltage of the fully differential charge integrator (112) due to a displacement of the input common mode.

9. Detection circuit according to claim 4, wherein a compensation adjustment circuit is provided, which detects an influence of a capacitive mis-reconciliation to the output voltage of the detection circuit, and the compensation adjustment circuit automatically creates a capacitive compensation voltage based on the influence of the capacitive mis-reconciliation to the output voltage of the detection circuit.

10. Detection circuit according to claim 9, wherein the control loop is a sigma-delta modulator and the compensation adjustment circuit further comprises:
 a mixer for multiplication of the output voltage of the detection circuit with an output signal of the sigma-delta control loop, and
 a low-pass filter (LPF), which is connected with an output connection of the mixer.

11. Detection circuit according to claim 10, wherein the compensation adjustment circuit further comprises a controller, which corrects an amplitude of the feedback voltage in a manner that a mis-reconciliation $k_C$ is minimized.

12. Detection circuit according to claim 4, wherein at least one compensation capacitor is configured to be charged with the feedback voltage and discharged via a resistor connected with the first input connection of the detection circuit in order to provide a capacitive compensation.

13. Detection circuit according to claim 12, further comprising a switchgear unit (116) for switching the compensation capacitor between charging and discharging depending on a change of the control loop.

14. Detection circuit according to claim 1, comprising a compensation resistance, which is connected to the first input connection of the detection circuit and to a resistive compensation voltage.

15. Detection circuit according to claim 1, wherein further at least one first and one second controlled switch (104) are provided, which separate the output connection of the sensor (106) from the first input connection of the detection circuit (100) and connect the output connection of the sensor (106) with the feedback voltage.

16. Detection circuit for reading out at least one position signal of a micromechanical capacitive sensor with at least one oscillating element that can be excited so as to move in an oscillating manner,
 wherein at least one first input connection of the detection circuit (100) during operation is connected to at least one output connection of the capacitive sensor (106) and at least one output connection of the detection circuit (100) during operation is connected to a loop filter of a control loop (102), whereby the control loop (102) feeds back a feedback voltage depending on an output voltage of the control loop (201) to a second input connection of the detection circuit (100), so that a feedback force is applied to the capacitive sensor (106),
 wherein the detection circuit (100) at least comprises a further feedback branch ($R_{fb}$, $C_{fb}$), wherein at least one first and one second controlled switch (104) are provided, which separate the output connection of the sensor (106) from the first input connection of the detection circuit and connect it with a voltage corresponding to an input common mode of the detection circuit.

17. Method for controlling and time continuous analyzing of a micromechanical capacitive sensor with at least one oscillating element that can be excited so as to move in an oscillating manner and an electrostatic excitation unit comprising at least one capacity, wherein the method has the following steps:
 operation of the capacitive sensor in a control loop, wherein the control loop for providing a feedback force depending on an output voltage of the control loop (102) feeds back to the excitation unit, and
 detection of a displacement of the oscillating element by the detection circuit according to claim 1, wherein the output voltage of the control loop is modulated onto an input common mode of the detection circuit.

18. Coriolis rotation rate sensor with a primary electrostatic oscillating element that can be excited, wherein the Coriolis rotation rate sensor has the circuit according to claim 1 for controlling the primary electrostatic oscillating element and/or for feeding back a deflection of a secondary electrostatic oscillating element of the Coriolis rotation rate sensor.

* * * * *